INVENTOR.
ALBERT E. SLADE
BY
BLAIR & SPENCER
ATTORNEYS.

INVENTOR.
ALBERT E. SLADE
BY BLAIR & SPENCER
ATTORNEYS.

Jan. 17, 1961 A. E. SLADE 2,968,794

APPARATUS FOR MODIFYING THE INFORMATION STORED IN A PREWIRED CRYOTRON MEMORY

Filed May 8, 1957 3 Sheets-Sheet 3

INVENTOR.
ALBERT E. SLADE
BY
Blair & Spencer
ATTORNEYS 2,968,794
Patented Jan. 17, 1961

2,968,794

APPARATUS FOR MODIFYING THE INFORMATION STORED IN A PREWIRED CRYOTRON MEMORY

Albert E. Slade, Cochituate, Mass., assignor to Arthur D. Little, Inc., Cambridge, Mass.

Filed May 8, 1957, Ser. No. 657,851

10 Claims. (Cl. 340—173.1)

This invention relates to apparatus for modifying the contents of memories used in computers and like devices. More specifically, it is designed to add or remove information from memories whose operation depends on the superconductive properties of certain materials at depressed temperatures, and in particular, the invention relates to a device for nullifying gate conductors in memories operating on cryotron principles.

Figure 1:
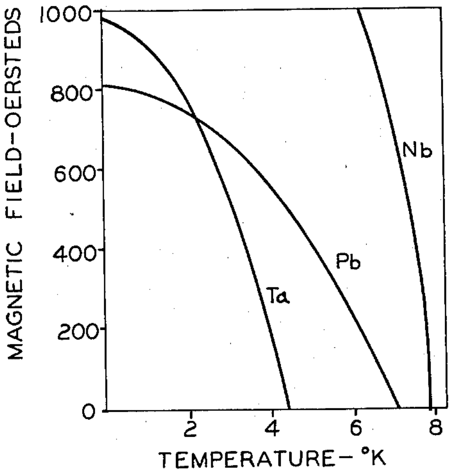
Figure 2:
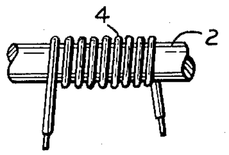
Figure 3:
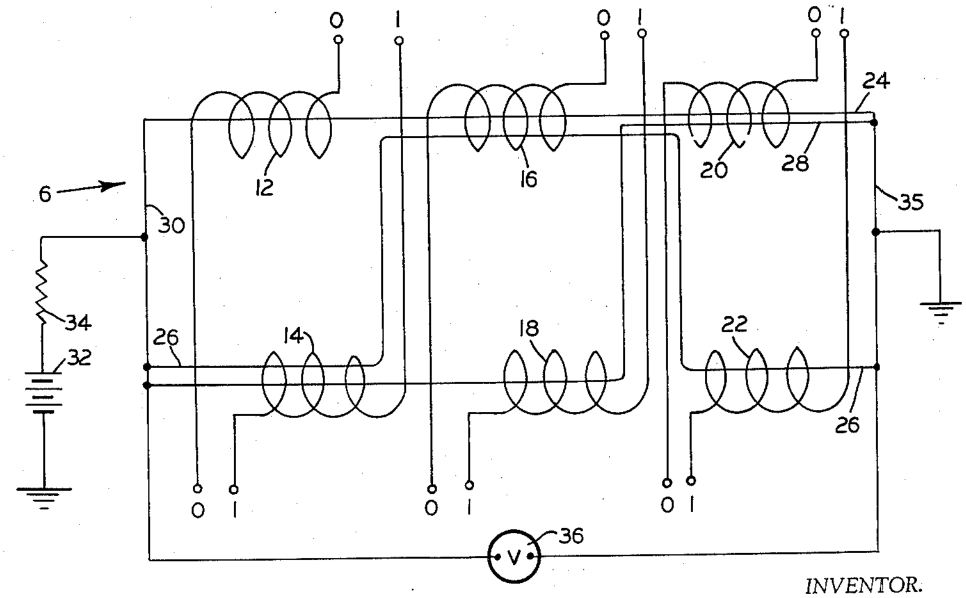
Figure 4:
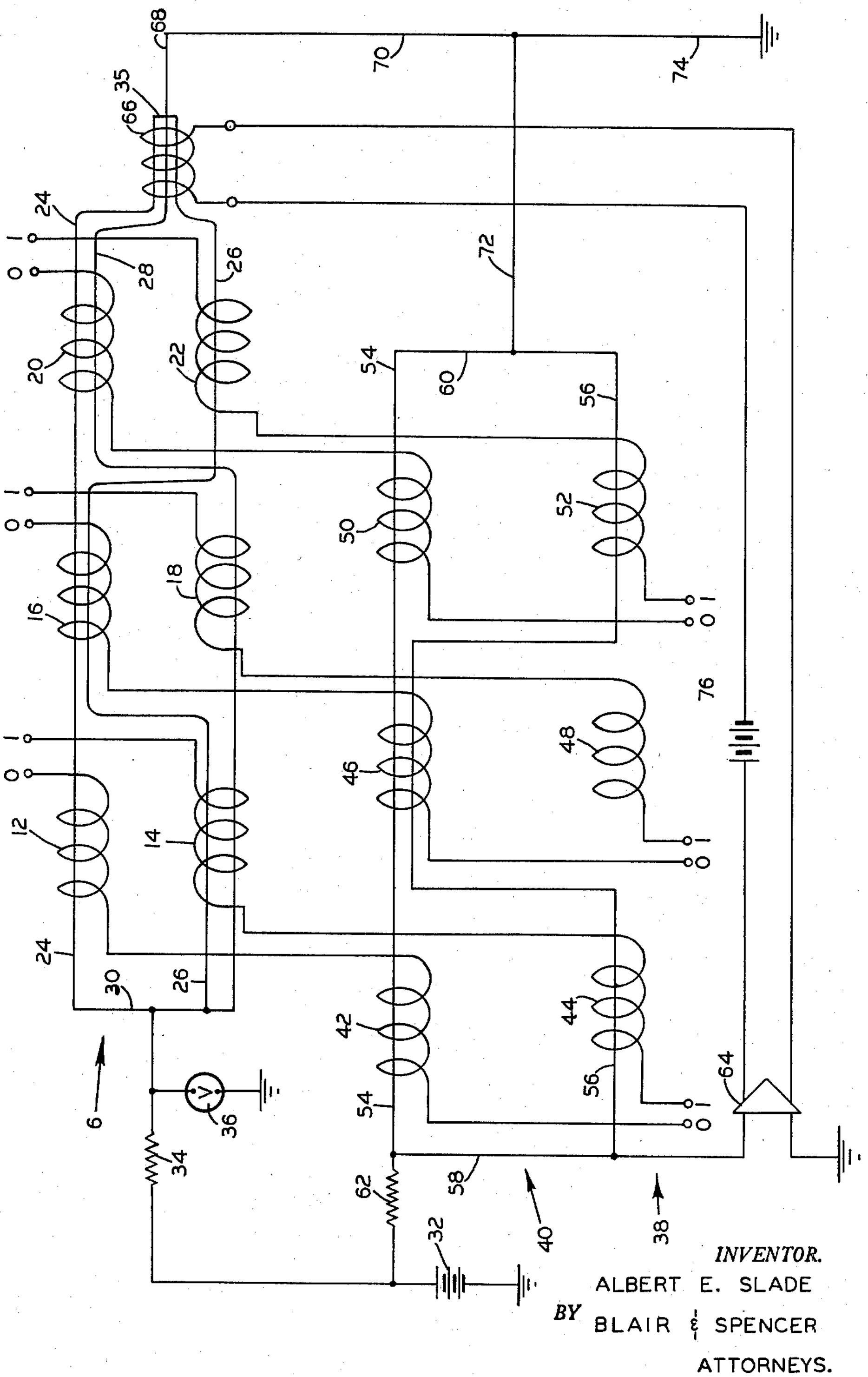
Figure 5:
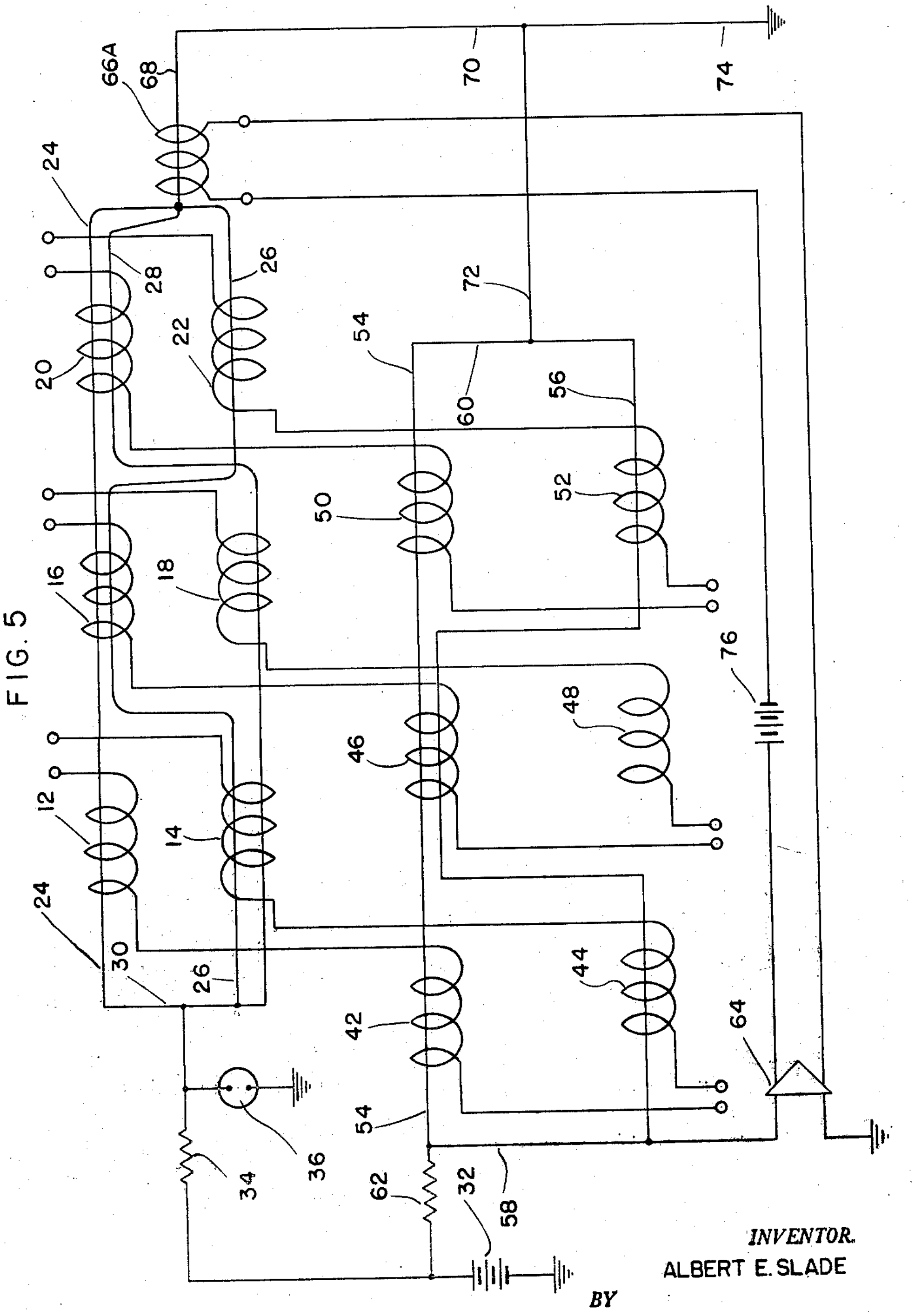

The operation and construction of my invention may best be understood from the following description taken with the accompanying drawings in which:

Figure 1 is a family of curves for different materials showing how the temperature at which a material becomes superconductive changes as a function of applied magnetic field, Figure 2 is a diagrammatic representation of an individual cryotron computing unit, Figure 3 is a diagrammatic representation of a memory operating on cryotron principles, Figure 4 is a diagrammatic representation of my memory modification device, shown connected for operation with the memory of Figure 3, and Figure 5 is a diagrammatic representation similar to Figure 4, illustrating another embodiment of my invention.

The cryotron, which is a switching element useful in digital computers, depends for its operation on the changes in properties of certain electrical conductors when subjected to temperatures approaching absolute zero. In the absence of a magnetic field these materials change suddenly from a resistive to a superconductive state in which their resistance is identically zero as their temperature approaches absolute zero. The temperature at which this change occurs is known as the transition temperature. When a magnetic field is applied to the conductor, the transition temperature is lowered, the relationship between applied magnetic field and transition temperature for a number of these materials being shown in Figure 1. As shown therein, in the absence of a magnetic field tantalum loses all electrical resistance when reduced to a temperature of 4.4° K. or below, lead does so at 7.2° K., and niobium at 8° K. In all there are 21 elements, in addition to many alloys and compounds, which undergo transition to the superconductive state at temperatures ranging between 0 and 17° K. The presence of a magnetic field causes the normal transition temperature to move to a lower value, or, if a constant temperature is maintained, a magnetic field of sufficient intensity will cause the superconductive material to revert to its normal resistive state. From Figure 1 it is apparent that a magnetic field of between 50 and 100 oersteds will cause a tantalum wire held at 4.2° K. (the temperature of liquid helium at atmospheric pressure) to change from a superconducting to a resistive state.

The cryotron is a circuit element which makes use of the shift between the superconductive and normal resistive states of these materials, when held at constant temperatures. For example, Figure 2 illustrates a typical individual cryotron having a central or gate conductor 2 about which is wound a control coil 4, both the gate conductor and the coil being of materials which are normally superconductive at depressed temperatures. The entire unit is immersed in liquid helium to render the gate wire 2 and the control wire 4 superconductive. If a current of sufficient magnitude is applied to the control coil, the magnetic field produced thereby will cause the gate conductor to transfer from a superconductive to a resistive state. Thus the control coil and gate wire form an electrically operated switch which can be changed from a superconductive to a resistive state by the application of current to the control coil.

Tantalum is the preferable material for gate conductors, since its transition temperature in the 50 to 100 oersted region is 4.2° K., the boiling point of helium at a pressure of one atmosphere. This temperature is attainable without the use of complicated pressure or vacuum equipment for raising or lowering the temperature of helium. Niobium, which has a relatively high quenching field (the field strength required to render a superconductive material resistive), is usually used as the material for the control coil since it is desirable, and in many cases necessary, that the control conductor remain superconductive throughout the operation of the cryotron. This coil is subject to substantially the same magnetic fields as those imposed on the gate conductor and otherwise would be quenched by its own self-field. In most applications it is desirable to have the control conductor in the form of a coil such as coil 4 in Figure 1 in order to reduce tthe current necessary to produce a quenching field.

In my copending application, Serial No. 645,776, filed March 13, 1957, for "Prewired Cryotron Memory," I have disclosed a memory utilizing cryotron principles in its operation and capable of long-term storage of large amounts of information. This memory is capable of providing "yes-no" answers as to whether a particular item of information belongs to a general classification. As an example, it may be desirable during the operation of a computer to know whether certain numbers are prime numbers. A prewired cryotron memory may be made which contains all the prime numbers within the range of the computer. Whenever the memory is interrogated by reading a number into it, it will respond with a "yes" or "no" answer which determines whether or not the number is a prime. These memories are capable of storing large amounts of information in a relatively small space and have minimum power requirements; thus, in addition to use in computers and like devices utilizing cryotrons as basic computing elements, they have wide application in systems using vacuum tubes, transistors, and other similar elements.

The operation of my prewired cryotron memories may be understood with reference to Figure 3 in which a memory generally indicated at 6 includes a plurality of control coils 12, 14, 16, 18, 20, and 22 similar to the control coil 4 in Figure 2. These coils are arranged in input pairs, i.e., coils 12 and 14, 16 and 18, and 20 and 22, for use with a digital computer or the like utilizing a binary code. Thus one coil of a given pair is energized for a Zero input and the other is energized for a One input. Each pair may be said to form a control station. More particularly, coils 12, 16, and 20 may be utilized as Zero inputs and coils 14, 18, and 22 as One inputs. A series of gate conductors 24, 26, and 28 are threaded through the control coils, each conductor passing through a different combination of coils. These conductors or wires are made of material, such as tantalum, which is superconductive at the temperature of operation of the memory. Conductor 24 is threaded through Zero coils 12, 16, and 20; conductor 26 is threaded through One coil 14, Zero coil 16, and One coil 22; and conductor 28 passes through One coils 14, and 18 and Zero coil 20.

The gate conductors are superconductively tied together at one end, illustratively by a wire 30, and to a power supply illustratively indicated by a battery 32 and a resistor 34, the resistor preferably having substantially greater resistance than the rest of the circuit so that the power supply is essentially a constant current source. The other ends of the gate conductors are also superconductively tied together, illustratively by a wire 35, and, for purposes of illustration, returned to the battery 32 through a ground connection. If they are connected to a common point through other circuit elements, these latter elements should be superconductive for proper operation of the circuit. A device for reading the voltage across the memory 6 is illustratively indicated as a voltmeter 36. During operation, the entire unit, including the modification circuit to be hereinafter described, may be immersed in a bath of liquid helium to maintain the gate conductors and wires 30 and 35 in a normally superconductive state.

In operation, control currents are impressed on either the Zero (12, 16, 20) or One (14, 18, 22) coil at each station to cause the gate conductors therethrough to become resistive. For any such combination of coil energization, there is only one possible gate conductor in the memory which may not pass through any of the energized coils and thus remain superconductive; all other gate conductors must pass through at least one of the energized coils and become resistive under the influence of the magnetic fields developed in them. If this one possible superconductive gate conductor is present in the memory, there will be Zero resistance through the memory, and the voltage developed thereacross as indicated by the voltmeter 36 will be zero. On the other hand, if this conductor is not present, the memory will be resistive, and a voltage will be developed across it as a result of current flowing from the current source and indicated by the meter. Thus, if each word stored in the memory is represented by a gate conductor, the presence or absence of a word in the memory may be indicated by the presence or absence of the corresponding gate conductor, as shown by the reading on the meter 36.

As pointed out in the above-referenced copending application, the largest possible number of gate conductors passing through different combinations of control coils in the above manner is $2^n$ where $n$ is the number of control stations. Where the number of words to be stored in the memory is greater than one-half this number or $$\frac{2^n}{2}$$

it is more convenient to let the gate conductors represent words not stored in the memory and the missing gate conductors represent words which are stored therein. Thus the memory will seldom have more than $$\frac{2^n}{2}$$

conductors in it.

Still referring to Figure 3 and assuming that each gate conductor represents a binary number or word stored in the memory 6, assume it is desired to determine the storage of the number 010 therein. Zero coil 12, One coil 18, and Zero coil 20 are energized by passing sufficient current through them to quench the gate conductors within them. Gate conductor 26, passing through none of these coils, is unquenched and remains superconductive. Since the resistance through the memory is zero, the voltmeter 36 registers zero voltage, indicating the storage of 010 in the memory. Gate conductor 26 may be labeled the 010 gate conductor because upon energization of the Zero, One, Zero sequence of control coils, it remains superconductive. Likewise, gate conductor 24 may be labeled 111 and gate conductor 28, 001.

If it should be desired to ascertain the storage of the binary number 110 in the memory 6, One coils 14 and 18 and Zero coil 20 would be energized and the memory would become resistive, since the only possible superconductive conductor, a 110 conductor passing through Zero coils 12 and 16 and One coil 22, is not present. The current from the power supply passing through the memory would then cause a voltage to be registered across the voltmeter 36 indicating nonstorage of the number.

While I have described and illustrated a three control station memory storing three words, this has been done for explanatory purposes only. In practice, memories of 21 control stations capable of storing a million words may be used. A memory of this capacity, having over a million gate conductors, may be packaged in a space under thirty-six inches long by three inches wide by three inches high. This large storage capacity in an extremely small size is one of the primary advantages of memories of the type described. In such memories, it is often desirable to modify the contents of the memory, i.e., add or remove items of stored information. This may be due to changes in classification of certain items, bringing them within or without classification of items stored in the memory, perhaps to mistakes in the construction of the memory, or for various other reasons. In order to modify the contents of a memory of this type, it is necessary either to add a gate conductor (to add items of information when a gate conductor represents a stored item or to remove information when a missing gate conductor represents a stored item) or to remove or otherwise nullify the effect of a gate conductor (to delete stored items when a gate conductor represents stored information or add information when a missing conductor represents stored items).

A gate conductor may be added to the memory with relative ease without disturbing the memory itself merely by connecting the new conductor in parallel with the memory. The conductor will have control coils corresponding to the control stations of the memory, each of the control coils being connected in series with the control coils in the memory which are not energized when it is desirable that the conductor remain superconductive. At all other times during operation of the memory, at least one of these coils will be energized to render the new conductor resistive. Thus with the new conductor connected in parallel, if it is desired to interrogate the memory to determine the presence of the binary word represented by the new conductor, the corresponding coils in the memory and thus the control coils of the new conductor will not be among those energized. There being a superconductive path through the new conductor, the memory will be superconductive and there will be a zero voltage reading thereacross to indicate the storage of a word. When the memory is interrogated for any other word, one or more of these coils will be energized and the new conductor will be rendered resistive and therefore not affect an operation of the original memory.

Where it is desired to nullify a gate conductor in a prewired cryotron memory, a considerably more serious problem arises. Heretofore, conductors were physically removed from the memory in order to nullify them. These wires may have diameters on the order of 1 mil, and, since they are interwoven by threading through the various control coils, it is extremely difficult to remove one gate conductor without breaking one or more of the others. Moreover as previously mentioned, these memories may contain upwards of a million or more gate conductors, rendering it practically impossible to physically locate the unwanted conductor, especially in view of the compact construction.

Accordingly, it is an object of my invention to provide apparatus for modifying the contents of a memory operating on cryotron principles. It is another object of my invention to provide apparatus for nullifying a gate conductor in a prewired cryotron memory. It is a further object of my invention to provide apparatus of the above character capable of deriving its input signal from other cryotron devices. It is a still further object of my invention to provide apparatus of the above character utilizing the superconductive properties of certain materials at depressed temperatures. It is yet another object of my invention to provide apparatus for nullifying a gate conductor in a prewired cryotron memory which does not require access to the interior of the memory. It is a further object of my invention to provide apparatus of the above character which does not require physical location of the gate conductor to be nullified. Yet another object of my invention is to provide apparatus of the above character which is of simple and low cost construction. Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In general, my invention operates to nullify an unwanted gate conductor in a cryotron memory by rendering the memory resistive when it would otherwise be superconductive because of the superconductivity of the gate conductor in question. A modification control coil is wound around all the gate conductors of the memory or around a gate conductor in series with all the gate conductors. The current through this coil is controlled by a second or modifying cryotron memory operating in conjunction with the first or main memory. The second memory has only those gate conductors which correspond to the unwanted gate conductors in the first memory, and therefore it will be superconductive whenever one of the unwanted gate conductors in the main memory is superconductive. At all other times during the interrogation of the main memory, the second memory hereinafter called the "modification memory," is resistive. Sensing means such as an amplifier may be used to determine the conductive state of the modification memory be reading the voltage across it, and the output of the amplifier may be used to control directly the current through the modification control coil.

As seen in Figures 4 and 5 a modification circuit generally indicated at 38 includes a memory indicated at 40 constructed so as to be superconductive whenever an unwanted gate conductor, e.g., conductors 24 and 26 of the memory 6 is superconductive. The memory 40 has three control stations comprising control coils in the Zero-one pairs 42 and 44, 46 and 48, and 50 and 52. As shown in Figure 4, these coils are connected in series with their counterpart control coils in the main memory 6. Gate conductor 54 in the modifying memory is threaded through Zero coils 42, 46 and 50 and a gate conductor 56 through One coil 44, Zero coil 46, and One coil 52. These gate conductors may be superconductively connected together at their ends by wires 58 and 60. Wire 58 is shown connected to battery 32 through a resistor 62, and wire 60 is shown connected to the other side of the battery through a ground connection. To sense the voltage across the memory 40, and therefore also its conductive state, I provide an amplifier 64 whose input terminals are connected across the memory. The output of amplifier 64 is connected to a modification control coil 66 (Figure 4) illustratively wound around the gate conductors of the memory 6 or, as shown in Figure 5 a coil **66*a*, may be wound around a single gate conductor 68 in series with the other gate conductors of the memory. In either case the control coils 66 or 66*a* may be considered to be "wound around the memory," since the memory includes all portions of the circuit across which the voltage sensing means 36 previously described is connected. It will be noted that for the meter 36 and amplifier 64 to function satisfactorily when one input terminal of each of them is connected to ground, the wires 70, 72 and 74 between the memories 6 and 40** and ground should be superconductive throughout the operation of the apparatus.

The gate conductors 54 and 56 are always in the same conductive state, i.e., resistive or superconductive, as are their counterparts 24 and 26 in the memory 6. For example, if control coils 12, 18 and 20 of memory 6 are energized to leave conductor 26 superconductive, coils 42, 48 and 50 of memory 40 will also be energized leaving gate conductor 56 superconductive. Thus memory 40 will be superconductive whenever gate conductor 24 or 26 is superconductive and will be resistive at all other times.

Amplifier 64, which senses the conductive state of the memory 40, is adapted to energize coil 66 and **66*a* to render the gate conductors therein resistive whenever it is superconductive and to leave these control coils unenergized at all other times. Thus, whenever conductor 24 or 26 becomes superconductive, memory 40 is also in that state, and the amplifier 64, by quenching the memory 6, will cause the latter memory to be resistive. Voltmeter 36 will then indicate the absence of the unwanted gate conductors. These gate conductors are therefore effectively nullified by the circuit 38**.

The various elements of the circuit 38 may have constructions similar to those of the memory 6. Thus the memory 40 may have the physical appearance of a rope in which coils are wound about various groups of strands. The gate conductors may be formed from 1 to 3 mil tantalum wire, the lower size limit being determined by the problems involved in handling, connecting, welding, etc., fine wire. The wire should be as small as possible to minimize the cross sectional area of the control coils which are wound around the gate conductors. The inductances of the coils, and thus the switching time of the memory when driven from another cryotron source, may thereby be minimized. Tantalum is a preferable material for the gate conductors because of the relatively low magnetic field intensity required to render it resistive at the preferred temperature of operation of the memory.

The control coils 42—52 may be formed from 3 mil closely wound niobium wire which is not quenched by the current required to quench the gate conductors. Where input signals to these coils are supplied from other cryotron elements, the coils should be capable of developing a quenching field of approximately 100 oersteds over their cross sectional area without causing self-quenching of the cryotron gate conductors to which they may be connected. For example, in the memory 40, control coils 1 inch long and having approximately 250 turns per inch will provide sufficient field to quench the tantalum gate wires and yet not require currents from other cryotron circuits sufficient to cause self-quenching of the tantalum gate conductors in such circuits. In applications not requiring inputs from other cryotron devices, the input coils need not be superconductive and may have any number of turns consistent with the current capabilities of the input voltage sources. Insulation on the gate conductors and the control coils should be as thin as possible. Illustratively it may be a one half mil coating of sintered polytetrafluoroethylene.

Control coil 66 or **66*a* preferably has the same constructional features as the control coils of memory 40. If the amplifier 64 is a cryotron device this control coil should remain superconductive at all times for proper operation. The gate conductor 68** is preferably of tantalum for the reasons stated above.

It will be noted that amplifier 64 provides an output current when its input voltage is zero (memory 40 superconductive) and conversely its output preferably is zero when the input voltage reaches maximum magnitude, i.e., memory 40 is resistive. There are several methods well known in the art for accomplishing this result. Illustratively, the amplifier may include a battery or other voltage source 76 in series with an output lead and adapted to pass a quenching current through control coil 66 or 66*a*. The remainder of the amplifier may be of conventional construction, with its output voltage of such polarity as to oppose the battery 76. Thus when memory 40 is resistive the output voltage from the last stage of the amplifier will oppose battery 76 to keep the current through the control coil below the level necessary to quench the gate conductors passing therethrough. Memory 6 will then be unaffected by the operation of circuit 38. However, when memory 40 is superconductive, the final stage of the amplifier 64 will have a zero output voltage and battery 76 will provide a current to quench memory 6 and nullify gate conductor 24 or 26 in the manner described.

In summary, gate conductors 24 and 26 of the main memory 6 may be nullified by a current passing through a control coil 66 wound around the memory, thus rendering the memory resistive whenever these gate conductors would otherwise be superconductive. The volt meter 36 connected to sense the conductive state of memory 6 then registers a voltage indicating the absence of these gate conductors. The current to the control coil 66 is determined by the conductive state of the modification memory 40, which is arranged to be identical with that of the unwanted gate conductors. An amplifier 64, or other means sensing the conductive state of memory 40, allows a quenching current to pass through this control coil whenever the memory 40 is superconductive, to provide the effect described; at all other times the memory 6 is unaffected by the modification circuit.

It will be apparent that a gate wire nullification circuit of the type described may be used with a prewired cryotron memory of any size and any number of stations, the memory 40 in the deletion circuit generally having a station corresponding to each station in the main memory 6. Moreover, additional gate conductors in the main memory may be deleted by replacing the deletion memory 40 with a new one or by adding another deletion memory and associated modification control coil similarly connected to memory 6. Further, other apparatus than an amplifier may be used for sensing the conductive state of the memory 40 and controlling the current to the control coil 66 or 66*a* and such modifications are within the purview of my invention.

Thus I have described circuit for nullifying the effect of a gate conductor in a prewired cryotron memory and thereby modifying the contents of the memory. The modification may be the deletion of information from the memory of the addition of information thereto, depending on whether the gate conductors or absent gate conductors represent stored items. My memory modification circuit may be connected externally of the memory and thus avoids the necessity of tampering with its interior components to thereby eliminate accidental breakage of other gate conductors. Moreover, the use of my circuit does not require physical location of the gate conductor to be nullified. My circuit is easily connected to a prewired cryotron memory, and its operation is completely automatic and reliable. Moreover, it is simple and of low cost construction, so that the contents of prewired cryotron memories may be readily changed, thereby lending a large measure of flexibility to these memories.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention hereinafter described and all statements of the scope of the invention which, as a matter of language, might be said to fall therebetween.

I claim:

1. In apparatus for modifying information stored in a first pre-wired cryotron memory of the type in which storage of information may be ascertained by determining the presence of a superconductive gate conductor therein as indicated by the conductive state of said memory when it is interrogated, means for nullifying the effect of one or more gate conductors therein comprising, in combination, a second pre-wired cryotron memory so constructed and connected as to have a first conductive state when a gate conductor to be nullified in said first memory would otherwise be superconductive and to have a second conductive state when none of the gate conductors to be nullified would otherwise be superconductive, a modification control conductor in close proximity to said first memory whereby current through said modification control conductor may give rise to a magnetic field causing said first memory to transfer from a superconductive to a resistive state, and means responsive to the conductive state of said second memory adapted to control the current through said modification control conductor to render said first memory resistive whenever said second memory has said first conductive state.

2. The combination defined in claim 1 in which said modification control conductor is in the form of a coil wound around said first memory.

3. The combination defined in claim 1 in which said memories have input control conductors and are so constructed that currents through said input control conductors give rise to magnetic fields which render various gate conductors resistive and the input control conductors of said second memory are connected in series with the corresponding input control conductors of said first memory, and said second memory includes a gate conductor corresponding to and thereby having the same conductive state as each of said gate conductors to be nullified in said first memory.

4. The combination defined in claim 1 in which said second memory is superconductive whenever one of said gate conductors to be nullified in said first memory is superconductive.

5. In apparatus for modifying information stored in a first pre-wired cryotron memory of the type in which storage of information may be ascertained by determining the presence of a superconductive gate conductor therein as indicated by the conductive state of said memory when it is interrogated and in which the conductive states of a plurality of normally superconductive gate conductors are controlled by a series of input control conductors to which said gate conductors are magnetically coupled in various combinations, means for nullifying the effect of one or more gate conductors therein comprising, in combination, a second pre-wired cryotron memory having input control conductors corresponding to said input control conductors of said first memory and serially connected thereto, a gate conductor corresponding to each of said gate conductors to be nullified, whereby upon energization of said input control conductors of said first memory to interrogate it, the corresponding input control conductors in said second memory are also energized and said gate conductors in said second memory have the same conductive state as those to be nullified would have in the absence of said second memory, whereby said second memory is superconductive when any of said gate conductors to be nullified would otherwise be superconductive, a modification control conductor magnetically coupled to the first memory, said first memory thereby being adapted to transfer between a superconductive and a resistive state under the influence of a change in the magnetic field developed by a current in said modification control conductor, and means responsive to the conductive state of said second memory adapted to control the current through said modification control conductor to render said first memory resistive whenever said second memory is superconductive.

6. The combination defined in claim 5 in which said modification control conductor is in the form of a coil wound around said first memory.

7. The combination defined in claim 5 including an amplifier whose input is connected across said second memory and whose output is connected to control the current in said modification control conductor.

8. The combination defined in claim 1 in which said modification control conductor is magnetically coupled to a normally superconductive modification gate conductor in series with the other gate conductors of said first memory, whereby the current through each of said other gate conductors passes through said modification gate conductor and whereby current through said modification control conductor may give rise to a magnetic field adapted to render said series gate conductor resistive.

9. The combination defined in claim 5 in which said modification control conductor is magnetically coupled to a normally superconductive modification gate conductor in series with the other gate conductors of said first memory, whereby the current through each of said other gate conductors passes through said modification gate conductor and whereby current through said modification control conductor may give rise to a magnetic field adapted to render said series gate conductor resistive.

10. A prewired cryotron memory comprising, in combination, a resistance unit comprising a plurality of gate conductors connected in parallel with each other, said gate conductors being superconductive at the temperature of operation of said memory in the absence of an applied magnetic field and adapted to transfer to a resistive state upon the application of a quenching field thereto, a plurality of control conductors, said control conductors forming quenching crossovers with different combinations of said gate conductors, the gate conductor and control conductor at each quenching crossover being so disposed with respect to each other that a quenching current through the control conductor develops a quenching field for the gate conductor at the crossover, a quenching current in a control conductor being strong enough to quench only the gate conductors forming quenching crossovers with the control conductor, each gate conductor forming quenching crossovers with a unique combination of control conductors, storage or non-storage in said memory of a series of characters corresponding to a combination of control conductors through which quenching currents are passed is represented by the presence or absence of a superconductive gate conductor, means for indicating the conductive state of said resistance unit to determine the presence or absence of a superconductive gate conductor therein, means for nullifying the effect of one of said gate conductors, said nullifying means comprising a modification control conductor in close proximity to said memory, whereby a quenching current through said modification control conductor may give rise to a magnetic field imposing a resistive state on said memory, and means for passing a quenching current through said modification control conductor whenever quenching currents are passed through the combination of control conductors which form quenching crossovers only with gate conductors other than said one gate conductor.

References Cited in the file of this patent

The Cryotron—A Superconductive Computer Component, D. A. Buck, April 1956.